US009305109B2

(12) United States Patent
Baudel et al.

(10) Patent No.: US 9,305,109 B2
(45) Date of Patent: Apr. 5, 2016

(54) METHOD AND SYSTEM OF ADAPTING A DATA MODEL TO A USER INTERFACE COMPONENT

(71) Applicant: International Business Machines Corporation, Armonk, NY (US)

(72) Inventors: Thomas Baudel, Paris (FR); Frederic Delhoume, Montrouge (FR)

(73) Assignee: International Business Machines Corporation, Armonk, NY (US)

( * ) Notice: Subject to any disclaimer, the term of this patent is extended or adjusted under 35 U.S.C. 154(b) by 163 days.

(21) Appl. No.: 14/276,638

(22) Filed: May 13, 2014

(65) Prior Publication Data

US 2014/0250135 A1 Sep. 4, 2014

Related U.S. Application Data

(63) Continuation of application No. 13/510,250, filed as application No. PCT/EP2011/056412 on Apr. 21, 2011, now Pat. No. 8,762,426.

(30) Foreign Application Priority Data

Jun. 3, 2010 (EP) .................................... 10305589

(51) Int. Cl.
*G06F 17/30* (2006.01)
*G06F 9/44* (2006.01)

(52) U.S. Cl.
CPC ........ *G06F 17/30914* (2013.01); *G06F 9/4443* (2013.01); *G06F 17/30312* (2013.01); *G06F 17/30569* (2013.01)

(58) Field of Classification Search
CPC ................... G06F 17/30914; G06F 17/30569
USPC .................................................. 707/809, 810
See application file for complete search history.

(56) References Cited

U.S. PATENT DOCUMENTS

| 7,444,330 | B2 | 10/2008 | Bernstein et al. |
| 7,665,014 | B2 | 2/2010 | Kristiansen et al. |
| 7,739,223 | B2 | 6/2010 | Vaschillo et al. |
| 2005/0050068 | A1 | 3/2005 | Vaschillo et al. |

(Continued)

FOREIGN PATENT DOCUMENTS

| CN | 1604082 A | 4/2005 |
| EP | 1519266 | 3/2005 |

OTHER PUBLICATIONS

Chinese Office Action, dated Dec. 29, 2014, for Application No. 201180025482.0, Total 7 pages.

(Continued)

*Primary Examiner* — Thu-Nguyet Le
(74) *Attorney, Agent, or Firm* — Janaki K. Davda; Konrad, Raynes, Davda and Victor LLP

(57) ABSTRACT

A display of a source data model on a user interface component being associated with a target data model is provided. The source data model and the target data model comprise a collection of data types (class/object), each including a set of name and type attributes. For each source data type of the source data model, a matching target data type is determined among said target data types in the target data model. Said source data type is linked to said matching target data type. A display of said source data model using said link between a source data type and a target data type.

18 Claims, 11 Drawing Sheets

(56) References Cited

U.S. PATENT DOCUMENTS

| | | |
|---|---|---|
| 2005/0055369 A1* | 3/2005 | Gorelik .............. G06F 17/30292 |
| 2007/0179962 A1 | 8/2007 | Hernandez-Sherrington et al. |
| 2009/0125877 A1 | 5/2009 | Kuzsma, Jr. et al. |
| 2010/0077324 A1 | 3/2010 | Harrington et al. |
| 2012/0233182 A1 | 9/2012 | Baudel et al. |

OTHER PUBLICATIONS

Information Materials for IDS, dated Jan. 4, 2015, Total 2 pages.
U.S. Pat. No. 7,739,223, dated Jun. 15, 2010, is an English language equivalent of CN1604082A, dated Apr. 6, 2005.
US Publication No. 20050050068, dated Mar. 3, 2005, is an English language equivalent of CN1604082A, dated Apr. 6, 2005.
"Atlas Transformation Language", [online], Retrieved from the Internet at <URL: http://www.eclipse.org/atl/>, © 2012, The Eclipse Foundation, Total 2 pp.
Batini, C., M. Lenzerini, and S.B. Navathe, "A Comparative Analysis of Methodologies for Database Schema Integration", ACM Computing Surveys 18(4): 323-364, Dec. 1986, Total 42 pp.
Bezivin, J., G. Dupe, F. Jouault, G. Pitette, and J.E. Rougui, "First Experiments with the ATL Model Transformation Language: Transforming XSLT into XQuery1", OOPSLA 2003 Workshop, Anaheim, California, Total 18 pp.
Bull, R.I., "Integrating Dynamic Views Using Model Driven Development", Proceedings of the 2006 Conference of the Center for Advanced Studies on Collaborative Research, Toronto, Ontario, Canada, Oct. 16-19, 2006, CASCON '06, ACM Press, New York, NY, 17, Total 13 pp.
"Dojo Data Binding" [online], Retrieved from the Internet at <URL: http://dojotoolkit.org/api/dojox/wire.htrnl> on Aug. 2, 2012, Total 2 pp.
Gamma, E., R. Helm, R. Johnson, and J. Vlissides, "Design Patterns: Elements of Reusable Object-Oriented Software", Addison Wesley, 1994, ISBN 020166335612, Total 216 pp (out of 431 pp.) [Part A].
Gamma, E., R. Helm, R. Johnson, and J. Vlissides, "Design Patterns: Elements of Reusable Object-Oriented Software", Addison Wesley, 1994, ISBN 020166335612, Total 215 pp.(out of 431 pp.) [Part B].
"Flex: Data Binding Component", [online]. Retrieved from the Internet at <URL: http://livedocs.adobe.com/flex/3/html/help.html?content=data_intro_3.html> on Aug. 2, 2012, Total 3 pp.
"IBM ILOG JViews SDM Composer" [online], Retrieved from the Internet at <URL: http://www-01.ibm.com/software/integration/visualization/java> on Aug. 3, 2012, Software published 2002-2010 IBM, Total 1 p.
Response to Examination Report of May 15, 2013, dated Sep. 18, 2013, for International Application No. 11 716 224.6, Total 2 pp.

Examination Report, dated May 15, 2013, for Application No. 11716244.6-1954, Total 5 pp.
Written Opinion, dated Mar. 12, 2012, for International Application PCT/EP2011/056412, reference PCT/ISA/220, filed Apr. 21, 2011, Total 4 pages.
Madhavan, J. et al., "Generic Schema Matching with Cupid", dated Aug. 2001, Technical Report, Microsoft Research Microsoft Corporation, Total 15 pages.
International Search Report, dated Aug. 12, 2011, for PCT/EP2011/056412, reference PCT/ISA/220, filed Apr. 21, 2011, Total 4 pages.
International Preliminary Report of Patentability, dated Dec. 4, 2012, for International Application PCT/EP2011/056412, filed Apr. 21, 2011, Total 5 pages.
Response to Examination Report of May 15, 2013, for International Application No. 11 716 224.6, dated Sep. 18, 2013, 7 pp.
Rahm, E. and P.A. Bernstein, "A Survey of Approaches to Automatic Schema Matching", [online], Retrieved from the Internet at <URL: https://www.ki.informatik.hu-berlin.de/mac/lehre/lehrmaterial/Informationsintegration/Rahm01.pdf/view>, The VLDB Journal 10: 334-350 (2001), Digital Object Identifier (DOI) 10.1007/s007780100057. Total 17 pp.
"Perfect JPattern, Componentized Adapter Pattern", [online], Retrieved from the Internet at <URL: http://perfectjpattern.sourceforge.net/dp-adapter.html> on Aug. 3, 2012, last published Feb. 28, 2009, Total 1 p.
Van Putten, J., N. Scharenborg, and A. Woerlee, "A Generic User Interface Constructor for Planning and Scheduling Applicaitons", People and Computers VIII, Proceedings of HCI 93, 143-156, 1993.
Preliminary Amendment, dated May 16, 2012, for U.S. Appl. No. 13/510,250 (54.86), filed May 16, 2012, entitled "Method and System of Adapting a Data Model to a User Interface Component", invented by Thomas Baudel et al., Total 11 pages.
Office Action, dated Oct. 24, 2013, for U.S. Appl. No. 13/510,250 (54.86), filed May 16, 2012, entitled "Method and System of Adapting a Data Model to a User Interface Component", invented by Thomas Baudel et al., Total 30 pages.
Response to Office Action, dated Jan. 24, 2012, for U.S. Appl. No. 13/510,250 (54.86), filed May 16, 2012, entitled "Method and System of Adapting a Data Model to a User Interface Component", invented by Thomas Baudel et al., Total 10 pages.
Notice of Allowance, dated Feb. 14, 2014, for U.S. Appl. No. 13/510,250 (54.86), filed May 16, 2012, entitled "Method and System of Adapting a Data Model to a User Interface Component", invented by Thomas Baudel et al.,Total 21 pages.
Supplemental Notice of Allowance, dated Mar. 14, 2014, for U.S. Appl. No. 13/510,250 (54.86), filed May 16, 2012, entitled "Method and System of Adapting a Data Model to a User Interface Component", invented by Thomas Baudel et al.,Total 2 pages.

* cited by examiner

```
1 tuple MyInterval {
2   // recognized members
3   int start;
4   int end;
5   int size;
6   string label;
7   int present;
8   // additional member
9   int weight;
10 }
11
12 MyInterval anIntervalArray[1..2] =
13    {<10, 20, 10, "Interval 1", 1, 10>,
14     <15, 18, 5, "Interval 2", 1, 20>};
```

METHOD AND SYSTEM OF ADAPTING A DATA MODEL TO A USER INTERFACE COMPONENT

FIELD OF THE INVENTION

The present invention generally relates to graphical display of data and more specifically to a method and a system of adapting a source data model for display in a user interface component having a target data model.

BACKGROUND OF THE INVENTION

Today, the industry is striving to provide advancements in the field of graphical user interface programming. As the use of rapid prototyping and development of visual and interactive software components such as Gantt charts, maps, statistical views, and other sophisticated visual displays becomes more pervasive, there is a growing need to simplify the way a complex application data model is interfaced to such sophisticated user interface components that display the model.

As is well known, interfacing a complex application model with a user interface component requires the creation of a model adapter. Such model adapter has become a major piece of development as both the complexities of applications and user interfaces have increased.

On the other hand, it is commonly agreed that the time to implement a graphical user interface for a given application takes roughly half of the total software development time. To reduce this time, visualization toolkits and components provide ready-made visualizations that can be instantiated and connected to a matching data model. Yet, for many sophisticated user interface components, creating the data model to provide to the user-interaction part of the component is often complex. This means that complex model adapters have to be developed to allow specific applications to take advantage of the advanced features offered by the user interface component.

Many concerns have been raised in relation with the model adapters. One such concern stems from the fact that each application data model is unique so that these model adapters are hardly reusable from an application to another and fairly difficult to maintain. In particular, these adapters are tightly coupled to both the application and the user interface, introducing a point of contention when either part needs to evolve.

In the example of a user interface component of the type Gantt chart, the data model elements of the graphical component are "task" objects. Each task object has a time, duration, possibly labels or various constraints attached to these objects. Generally, on the backend side of the application, there is a complex scheduling application which integrates many constraints, and sophisticated activity descriptions composed of individual tasks and additional data. When such Gantt Chart is used in some optimization systems such as scheduling systems, it may occur that the data model used for optimization do not always match the data model to be provided to the user interface component. Also, some optimization tools used to create scheduling applications, such as IBM ILOG CPO, need to provide ready-to-use user interface components that are easily adaptable by the end-user, with limited User Interface configuration.

Many existing solutions address the problem of adapting application data models to a service (such as storage, user interface, validation . . . ). One approach used to create user interfaces provide some data binding features which enable declaratively specifying model adapters. For instance, the Dojo Data Binding module (http://dojotoolkit.org/api/dojox/wire.html) provides mechanisms to bind an application data model to its interface. This module requires binding each single attribute that is to be mapped, and also to provide conversion steps in case the match is not direct. While providing a degree of relaxation between the interface and the application, constructing such model adapters can be extremely tedious, and those models are difficult to maintain, as any change in either the interface or the application requires updating the adapter.

Other solutions are provided in the field of model-driven engineering (MDE). Model-driven engineering provides the development of interactive tools and languages to allow mapping complex source data models to target data models with a wide flexibility. Model-driven engineering systems rely on declarative languages for mapping a model to another one, in all generality and with some guarantees of preservation of the semantics of the source model. Example of such MDE systems are described in the article entitled "First experiments with the ATL model transformation language: Transforming XSLT into XQuery", OOPSLA 2003 Workshop, Anaheim, Calif. 2003, by Bézivin, J, Dupé, G, Jouault, F, Pitette, G, and Rougui, J E, and also in the article entitled "Integrating dynamic views using model driven development", in Proceedings of the 2006 Conference of the Center For Advanced Studies on Collaborative Research (Toronto, Ontario, Canada, Oct. 16-19, 2006), CASCON '06. ACM Press, New York, N.Y., 17, By Bull, R. I. Such MDE approach relates to generality of purpose and only focus on preserving a strong semantics. Further, MDE tools are not meant to allow the model adaptation to be fully automatic, at the cost of possible errors, mismatches or discarded data.

Another model adaptation solution known as the "Perfect JPattern" component provides partial name or type matching between the source and the target. This solution allows fixing slight differences between sources and targets without a particular developer intervention. However, this component is not adapted for use in an interactive context. It further requires that the user of the component explicitly activates specific matching capabilities to benefit from this adaptability. In the event the component does not find a suitable model, no supplementary efforts will be made to provide a working match and the component will simply signal an error and stop operating.

In another approach described in U.S. Pat. No. 7,444,330, a model matching solution is provided to match a source model to a target model based on tree matching algorithm. In the approach of U.S. Pat. No. 7,444,330, it is required to obtain a full matching between the source model and the target model. If the match is detected to contain errors, the match is required to be corrected, and this correction phase involves prompting the user to manually provide inputs. Further, if the model adapter fails to find a satisfying match, the user interface component also returns message error and stop operating.

SUMMARY OF THE INVENTION

According to the present invention there is provided a method of adapting a source data model for display in a user interface component according to the appended independent claim 1, a computer program according to the appended claim 11, a computer readable medium according to the appended claim 12 and a system according to the appended claim 13. Preferred embodiments are defined in the appended dependent claims 2 to 10.

The invention accordingly provides a fault-tolerant and transparent model adaptation solution that allows directly plugging specific application data models into general purpose visualization components. The invention performs loose pattern matching on the application data model, extracts the portion of the model it can present to the user and discards or present other means of interaction for the portions that cannot be presented by the user interface component (visualization component).

The invention further allows coupling sophisticated visualization components, such as Gantt charts to any type of application generating a source data model with minimal development overhead. The invention has particular advantages in the context of application prototyping, development under severe time constraints, or more generally for advanced user interfaces where only limited resources can be spent on the user interface development.

With the invention, there is no need to have a customized model adapter predefined for a particular source data model and target model. It is adapted to process any source data model for any target user interface component. This is particularly useful in the early stages of development, where it is required to hook up a data model directly to a visualization component.

The invention thus obviates the need for an intermediate development stage dedicated to the construction of a complex model adapter.

In the context of prototyping and developing proof of concept software involving iterations both on the application data model and on the user interface, much greater flexibility is obtained with the partial matching solution of the invention. More specifically, the model adaption is created fully automatically from a possibly evolving data model. The model adaptation solution according to the invention allows:
the externalization of an extensive set of matching rules, to be able to match any application data model to a number of user interface components, each component providing a specific target data model.
a broad acceptance of "possible" solutions even if matching solutions are imperfect or inexistent, allowing the user to use the user interface component at least partially with no correction phase needed.

Further advantages of the present invention will become clear to the skilled person upon examination of the drawings and detailed description. It is intended that any additional advantages be incorporated herein.

BRIEF DESCRIPTION OF THE DRAWINGS

Embodiments of the present invention will now be described by way of example with reference to the accompanying drawings in which like references denote similar elements, and in which:

FIG. 10 shows an exemplary source data model portion; and

FIGS. 11 to 13 show the solution corresponding to the exemplary portion of FIG. 10.

The drawings are intended to depict only typical embodiments of the invention, and therefore should not be considered as limiting the scope of the invention.

Additionally, the detailed description is supplemented with an Exhibit E containing examples of code implementations E1 to E5 used by the system and the method according to the invention. In the foregoing description, references to the examples of Exhibit E are made directly using the Exhibit identifiers "E1" to "E5".

Exhibit E1 is placed apart for the purpose of clarifying the detailed description, and of enabling easier reference.

As they may be cited in the following description, Java and all Java-based marks are trademarks or registered trademarks of Sun Microsystems, Inc, in the United States and other countries. Other company, product or service names may be the trademarks or service marks of others.

A portion of the disclosure of this patent document contains material which may be subject to copyright protection. The copyright owner has no objection to the facsimile reproduction by anyone of the patent document or the patent disclosure, as it appears in the Patent and Trademark Office patent file or records, but otherwise reserves all copyright and/or author's rights whatsoever.

DETAILED DESCRIPTION

Figure 1:
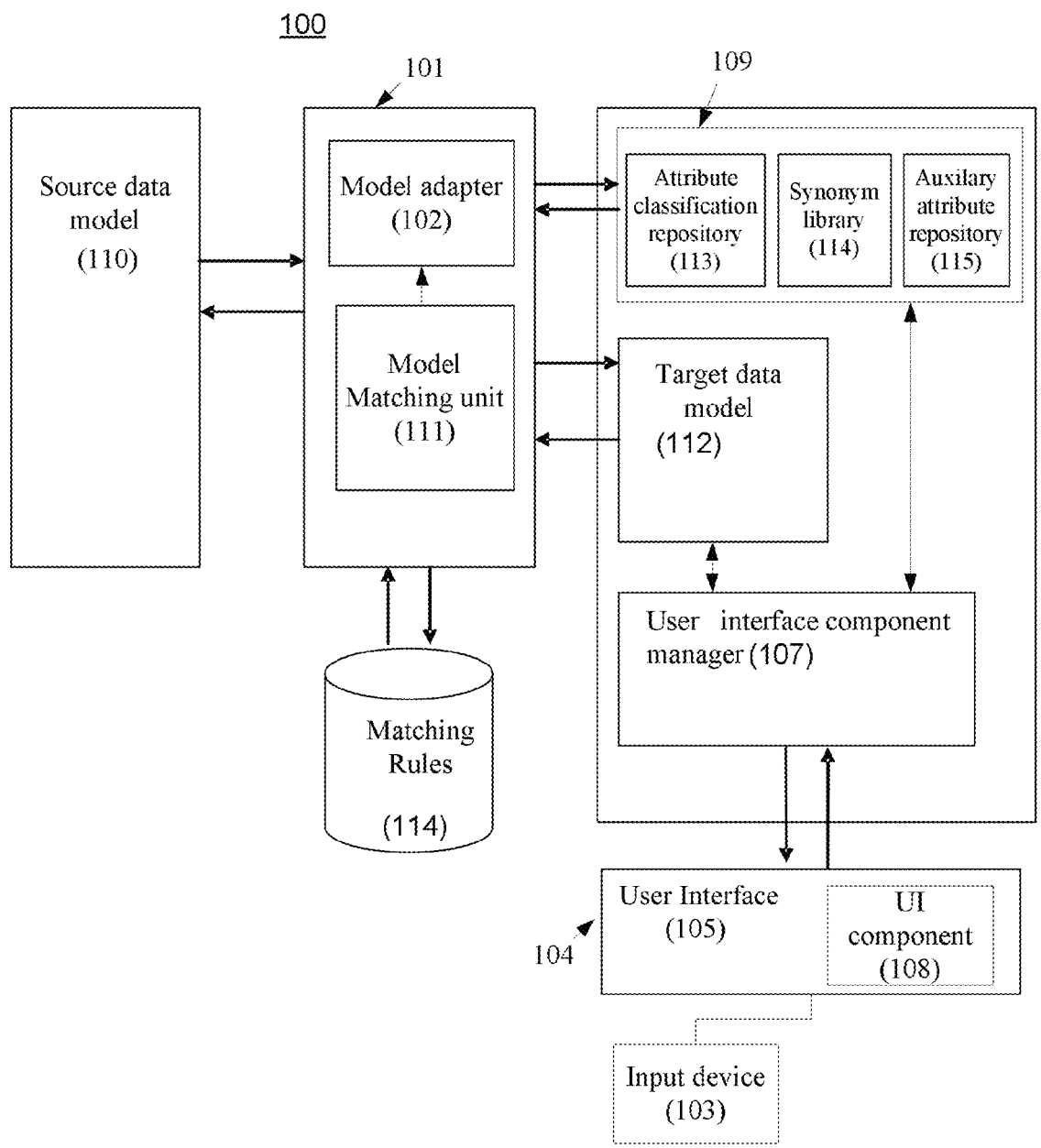
FIG. 1 shows schematically the model adaptation system according to certain embodiments of the invention.

FIG. 1 shows a computer system 100 for generating a display of a source data model 101 to a particular user interface component 108, in accordance with certain embodiments of the invention.

The computer system 100 may be any type of distributed computer system including a number of remote computer servers and clients connected through a network such as a local area network (LAN) or a wide area network (WAN). It may be also a standalone computer device such as a personal computer, a hand-held device, a server, a peer device or other common network node.

Each computer device in the computer system 100 typically includes a Central Processing Unit (CPU) connected via a bus to a memory, storage means, and a network interface device to allow network communications via a network (e.g. a network adapter or other network interface card (NIC)).

The computer system 100 may further comprise one or more input devices 103 that can be any type of device adapted to provide input to the computer system 100 such as a keyboard, a mouse, a keypad, etc. It further includes an output device 104 adapted to provide output to the user, such as any conventional display screen.

The output device 104 comprises a user interface 105 having at least one user interface component 108. The system 100 comprises a user interface component manager 107 for managing display of a user interface component 108 in the user interface 105. The user interface component represents any type of visualization display component or tool having specific visualization features, such as a Gantt chart, maps, statistical views, and other type of sophisticated visual displays.

The computer system 100 includes a source data model 110 (also referred to thereinafter as a source data set) which may be generated by any type of application or provided by the user. For example, the source data model 110 may be extracted from a program source in the context of an integrated development environment (IDE). The source data model 110 is provided to be displayed in the user interface component 108.

In accordance with the embodiments of the invention, the user interface component manager 107 is further associated with a target data model 112 (also referred to thereinafter as a target data set) defining the data model supported by the user interface component 108. For instance, in the case of a Gantt component, the component can display and let the user interact with data objects tuples, that consist of a start date (integer), end date (integer), and, optionally, a name and Boolean "presence" value. Other components can provide other abstract interfaces. For instance, a 2D plot display will require input objects that each have an x and y coordinate, with optional size, color and label information.

The computer system 100 also comprises with a model adaptation subsystem 101 for generating a display of the source data model to the user interface component 108 in a transparent and fault-tolerant manner.

The model adaptation subsystem 101 comprises a model matching unit 111 for matching the source data model 110 at least a part of the target data model 112 and allowing display of the source data set 110 to the user interface component 108 based on this partial matching.

The model matching unit 111 provides a model adapter 102 that will be used for adapting the source data model 110 to the user interface component 108.

The model matching unit 111 allows the user interface component to take as input any source data model 110 that is discoverable (i.e. the objects that constitute the model can be inspected through introspection and their attributes and values can be queried) and introspect the source data model 110 to display and interact with only the subset of the items that match the target data model 112.

More specifically, the model matching unit 111 examines the source data model 110, and discover the data elements of the source data model that have attributes whose types match the target data model 112 associated with the user interface component 108 based on predefined attribute matching rules 114 such as naming and/or typing rules (an exemplary naming rule may consist for example in determining whether a source attribute name match approximately a target attribute name, such as "begin" and "end" for "start" and "stop", or "length" for "duration", and so forth). The model matching unit 111 thus builds the intermediate model adapter 102 that references only these data elements and provides the model adapter 102 to the user interface component manager 107, using the declared view. The user interface manager 107 will generate the display corresponding to the model adapter 102 in the user interface component 108.

The source data set 110 comprises data and a description of the data structure as a set of types composing the data. A data type (or type) comprises a set of named and typed attributes and defines a set of operations that can be performed on this set of attributes. A class is a polymorphic data type whose operations and attributes can be extended and redefined in subtypes. In the following description, the terms "data type" or "type" or "target type" or "source type" will be used with a similar meaning. The source data set 110 accordingly represent collections of named and typed attributes.

The source data set 110 may be represented according to any suitable language or framework, such as Java classes described by their beans, an XML file, a JSON data structure, or even a SQL interface to a database.

Depending on the language used to represent and manage the source data set 110, the source data set 110 may be strongly typed, such as for example in Java classes or SQL tables representation, or weakly typed such as for example with JSON files representations. In weakly typed languages, each object defines its own data type, while in strongly typed, objects necessarily belong to a limited set of types.

If the source data set 110 is strongly typed, as for instance, in a Java program or an SQL database, the model matching unit 112 will apply a per-type basis to bind the source model 110 to the target model 112. If the source data set 110 is weakly typed, as for instance in an XML or JSON file, the model matching unit 112 will apply a per-object basis to bind the source model 110 to the target model.

Exhibit E1 provides an exemplary source data set 110 according to OPL language (IBM ILOG Optimization Processing Language) as a set of tuples. In the example of Exhibit E1, the description of the source data set 110 comprises four classes "start", "end", "duration", "label", the first three classes having an integer type "int" and the last class having a string type.

The Target data set 112 represents the particular data structure expected as input by the user interface component 108. The target data model 112 represents abstract data types. An abstract data type designates a collection of named, typed, attributes and operations that can be performed on these attributes. Classes are abstract data types which have in addition the properties of encapsulation, inheritance and polymorphism; Prototypes are another sort of abstract data types, used in the context of a language like JavaScript. The target data set 112 comprises the description of collections of data types (such as typed objects) that are acceptable as input for the user interface component 108. The target data model 112 accordingly represents collections of named and typed attributes.

The source data model 110 and the target data model 112 may be represented according to a different format or the same format. The following description will be made with reference to a source data model 110 and a target data model 112 provided in the same format according to Java programming language for illustrative purpose only. However, the skilled person will readily understand that the invention may be adapted to any environment where the source data model 110 and the target data model 112 can be accessed and explored programmatically.

The example of Exhibit E2 represents a user interface component 108 of the type Gantt chart which expects a specific target data model according to a Java interface representation.

In the exemplary target data model of Exhibit E2, the TASK interface comprises the following attributes: "begin" having a float type, "end" having a float type, "duration" having a float type and optionally "name" attribute having a string type.

It should be noted that the exemplary TUPLE structure provided for the data source model 110 and the exemplary Task interface structure for the target data model 112 represent similar objects so that there may be advantages in representing the Tuple objects array (source data model) in a Gantt chart component for such example.

The user interface component manager 107 may be also provided with an attribute information store 109 providing information related to the attributes used by the target data model 112. Such attribute information store 109 may contain an attribute classification repository 113 storing information identifying a first set of attributes that are required by the user interface component 108 (thereinafter referred to as "mandatory" attributes) and a second set of attributes that are not required by the user interface component 108 (referred to thereinafter as "optional" attributes). It may also include a synonym library 114 providing a list of the lexical synonyms for each attribute name of the target data model 112 and an auxiliary data repository 115 providing for each attribute in the target data model 112 a logical combination of auxiliary attributes that is equivalent to the considered attribute (for example attribute duration can be expressed as the combination of start attribute and end attribute).

Alternatively, the attribute information store 109 could be maintained by the model adaptation unit 101 for most usual attributes.

It should be noted that although FIG. 1 shows only one user interface component manager 107 associated with a specific UI component 108, the present invention supports any number of user interface components provided with their respective user interface component manager 107, target data model 112 and optionally with an attribute information store 109.

Figure 2:
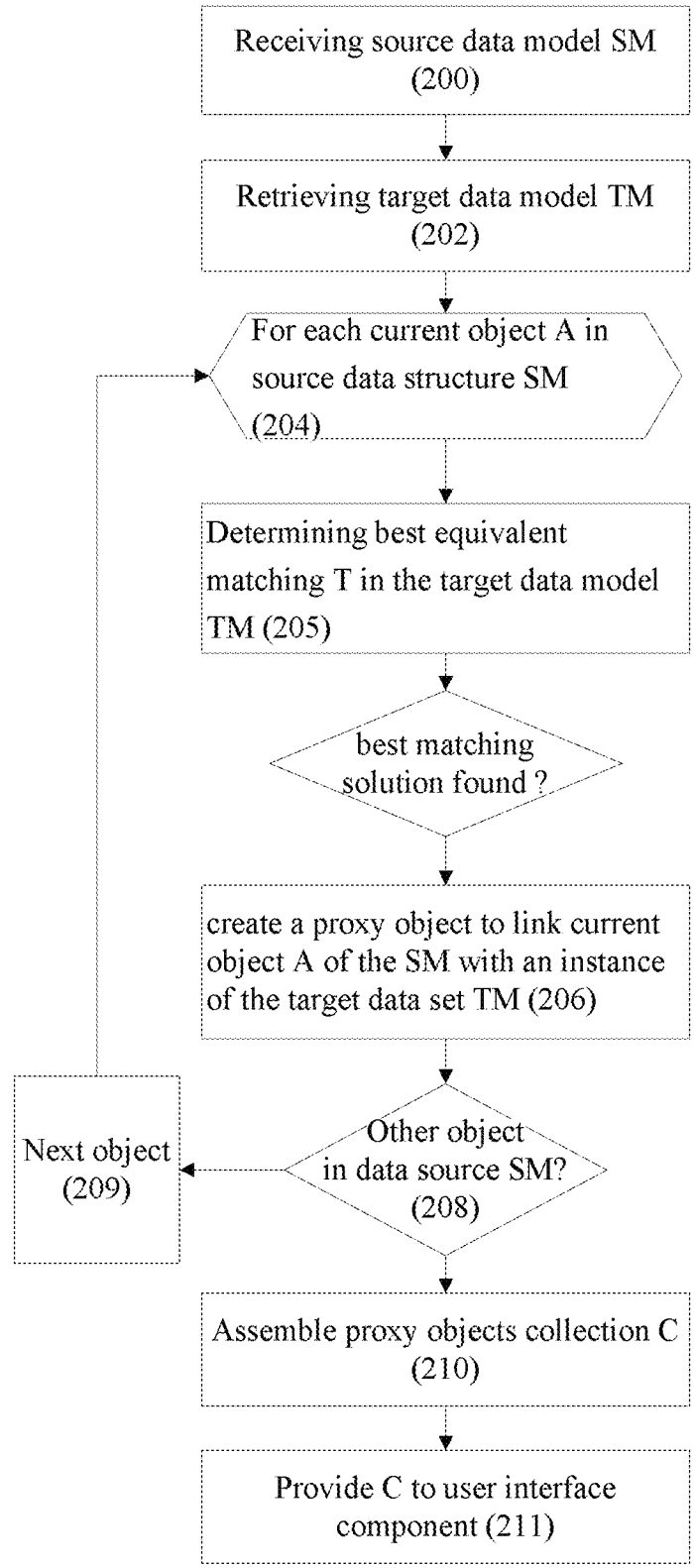
FIG. 2 is a high-level flowchart of the model adaptation system according to certain embodiments of the invention.

FIG. 2 shows a flowchart for generating a display of a source data model to the user interface component according to certain embodiments of the invention.

In step 200, the source data model SM is received from an application or directly provided by the user. For instance, the source data model can be generated as a result of a database query, or reside in XML files on an external server. In another example, the source data model can result from a program written by a user in the OPL language inside the IBM ILOG OPL Studio development platform (the platform interprets the program entered by the user, analyzes its data structures and provides a secondary view that displays all the available data structures of this program).

In step 202, the target data model TM is retrieved from its memory location. In particular, the target data model 112 may reside in main memory as the result of application operation.

Even if steps 200 and 202 are shown as successive steps they may be alternatively performed simultaneously or in the reverse order.

Steps 204 to 206 compute a collection C of target data model objects that will be provided to the user component manager 107 for generating a display of the source data model.

More specifically, the source data structure SM is traversed and for each current object A in the source data structure SM (selected in step 204), step 205 determines for the current object the best matching equivalent data type T in the target data model TM. To determine the best matching target type for the current source object A, a number of matching solutions are computed by applying a set of predefined matching rules and by assigning a priority score for each matching solution. The solution having the best priority score is provided as the best matching solution.

In the present description, the notion of "best matching" should be understood as designated a matching solution having the best score.

If a best matching solution is found in step 205, a binding data structure in the form of a proxy object is created in step 206 to link together the current object A of the source data model to an instance of data type T in the target data model TM.

Step 204 and 206 are repeated until all the objects of the source data set have been processed (step 208, 209).

When all the objects of the source data set have been processed, the collection C of proxy objects thus obtained is assembled in step 210 and provided to the user interface component manager in step 211.

The user interface component manager 107 will then generate a display of the source data model based on the binding data structure (proxy objects).

Figure 3:
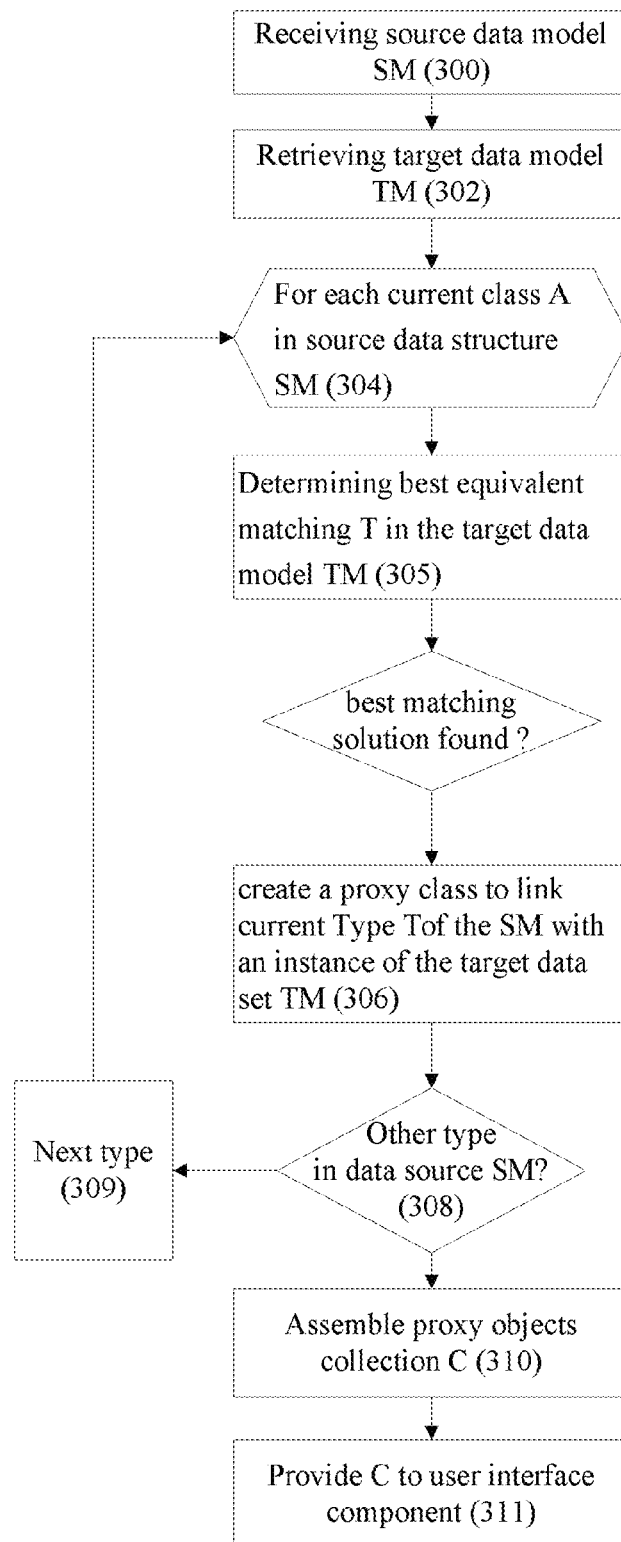
FIG. 3 is a high-level flowchart of the model adaptation system according to an alternative embodiment of the invention.

FIG. 3 shows a flowchart for generating display of a source data model 110 to the user interface component 108, according to an alternative embodiment of the invention involving a strongly typed source data model. For strongly typed source data model, there is no need to inspect each individual object of the source data model because all those objects will belong to one of the data types defined in the source data model. Instead of traversing each object, the source data types are directly inspected to create proxy classes and instantiate them. For instance, if the source data model is strongly typed and made only of objects of the class "Person" (a class is a kind of data type), the class person being composed of the attributes "name", "date of birth", "date of death", there is no need to inspect all the individual objects in the source model to determine that only one type of proxy object is needed. The proxy will map "name" in source data model to "name" in target data model, "date of birth" to "begin" and "date of death" to "end".

Exhibit E4 illustrates an exemplary code implementation of the flowchart of FIG. 3.

Steps 300 and 302 are similar to steps 200 and 202.

Steps 304 to 306 assemble a collection C of target data model types (e.g. class) that will be used by the user interface component manager 107 to generate a display of the source data model SM in the user interface component 108.

In step 304, the source data structure SM is traversed and for each current source data type T (step 304) in the source data structure SM, step 305 attempts to find a matching between the current type and a type in the target data model (illustrated by "ClosestType" function in E4).

If a match is found in step 305, a binding data structure in the form of a proxy type (e.g. proxy class) is created in step 306 to link together the current data type of the source data model with a data type of the target data model.

Step 304 and 306 are repeated until all the objects of the source data types have been processed (step 308, 309).

When all the data type of the source data set have been processed, the collection C of proxy classes thus obtained is used to assemble a collection of instances of these classes matching source objects to target objects in step 310 and the collection is provided to the user interface component in step 311.

The user interface component manager 107 then operates transparently on the collection of proxy objects assembled in step to generate a display of the source data model to the user interface component 108. The collection of proxy objects define a model adapter design pattern.

Exhibit E5 represents the class and data model that could be generated for the exemplary models of Exhibits E1 and E2 as a result of the method described in FIG. 3 (the exemplary source data model is in OPL language, which is a strongly typed language).

Figure 4:
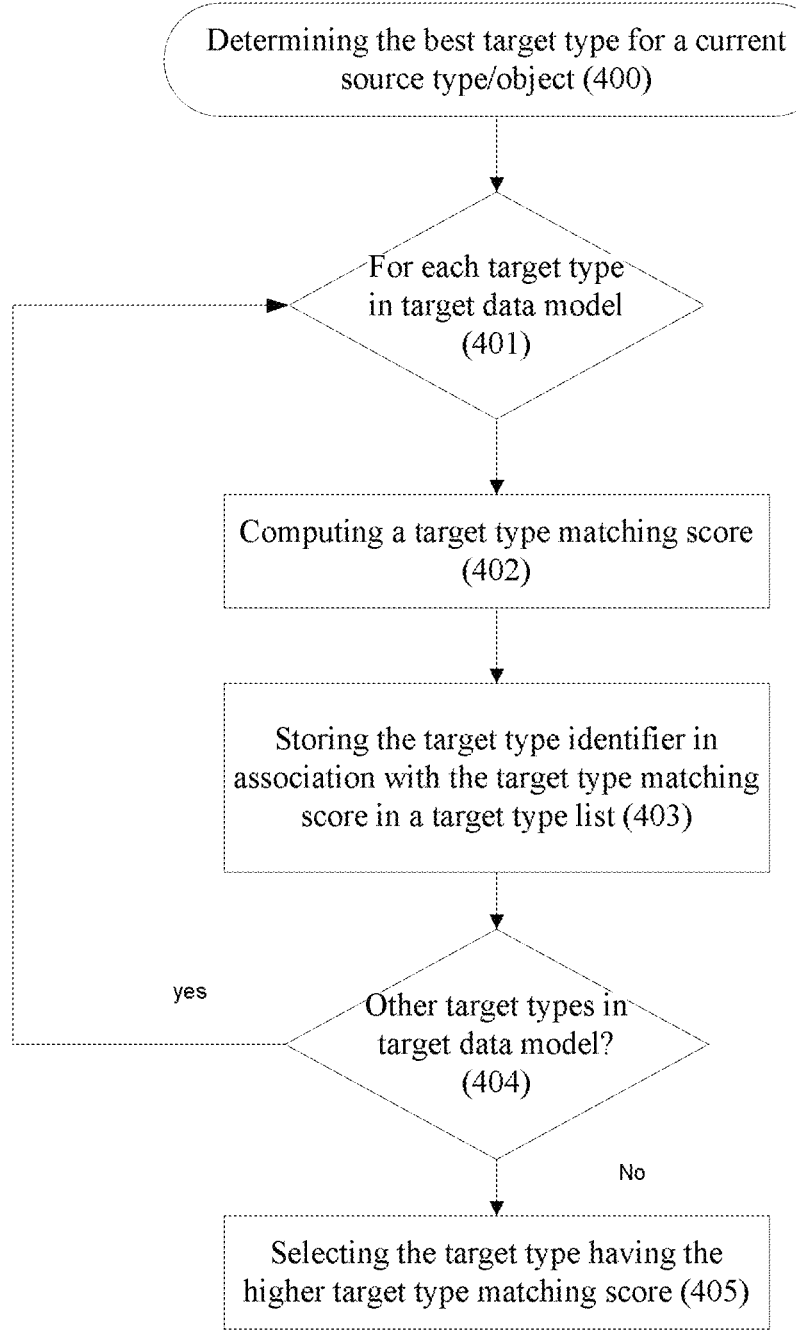
FIG. 4 shows a flowchart for determining the best matching target type for a given source type/object in the source data model.

FIG. 4 is a high-level flowchart of the steps performed to determine for a given source object or data type in the source data set SM the best equivalent matching in the target data model TM (step 205 and 305), according to certain embodiments of the invention.

The processing of FIG. 4 applies to any source data type that represents collections of named, typed attributes (source object or source type).

The method for determining the best target type is such that it allows the target user interface component to transparently generate a satisfying display of the source data model with useful functionality, even in cases where the match is determined to be imperfect or even when no match is found for a portion of the source data objects.

More specifically, to determine the best target type for a given source type or object, each target type in the target data model (step 400) is processed.

For each target type of the target model TM (step 401), step 402 computes a target type matching score by scoring the correspondences between each source attribute in the source type and each target attribute in a first set of attributes of the current target type (mandatory attributes). In step 402, even non-exact matches between source attributes and target attributes are scored (Step 402 is described in more details below with relation to FIG. 7).

Step 403 stores a target type identifier in association with the target type score thus obtained in a target type candidate list.

Steps 401 to 403 are repeated for all the target types in the target data model until all target types have been processed (step 404).

When all the target types have been processed, step 405 determines the best matching target type as the type having the best target type score in the target type candidate list.

To determine the target type score for each target type (step 402), a set of predefined name matching rules and/or a set of predefined type matching rules are applied to attribute pairs, each pair including a target attribute TA of the target type and a source attribute SA of the source type or object. The application of the set of name matching rules provide a name matching rule score nameMatch(SA, TA) and the application of the set of type matching rules provide a type matching rule score typeMatch(SA, TA). A combination of the name matching rule score nameMatch(SA, TA) and the type matching rule score typeMatch(SA, TA) is used to determine an attribute score value for each pair {SA, TA}.

A matching rule comprises the expression of a condition related to attribute name and/or attribute type between a source attribute in the source data model and a target attribute in the target data model, and the definition of a priority score to be associated to the pair {source attribute, target attribute} if the condition is satisfied.

In accordance with the embodiments of the invention, the matching rules of the set of matching rule are defined to ensure that each pair {source attribute, target attribute} will return a non null value, even if the target attribute and the source attribute are not identical.

The matching rules may comprise naming rules involving a comparison related to the attribute names between the source attribute in the source type and the target attribute in the target type. One such naming rule may consist in determining if the source attribute name exactly matches a target attribute name. If such rule is satisfied, the attributes will be bound together.

Other name matching rules could be additionally used such as:
  determining if the source name is a synonym of the target attribute name using the synonym library 114. For example, for a Gantt chart target model, the following synonyms could be used in association with the "begin" attribute of a Task: "start", "debut", "from" . . .
  determining if the source attribute name partially matches the target attribute name. This may occur for example if a portion of the source attribute name matches a target attribute name or one of its synonyms. For instance, if the source attribute name is "startActivity", a matching will be detected for a target attribute name "start". In such case, a lower score could be affected to this correspondence as the matching is only partial.

Figure 5:
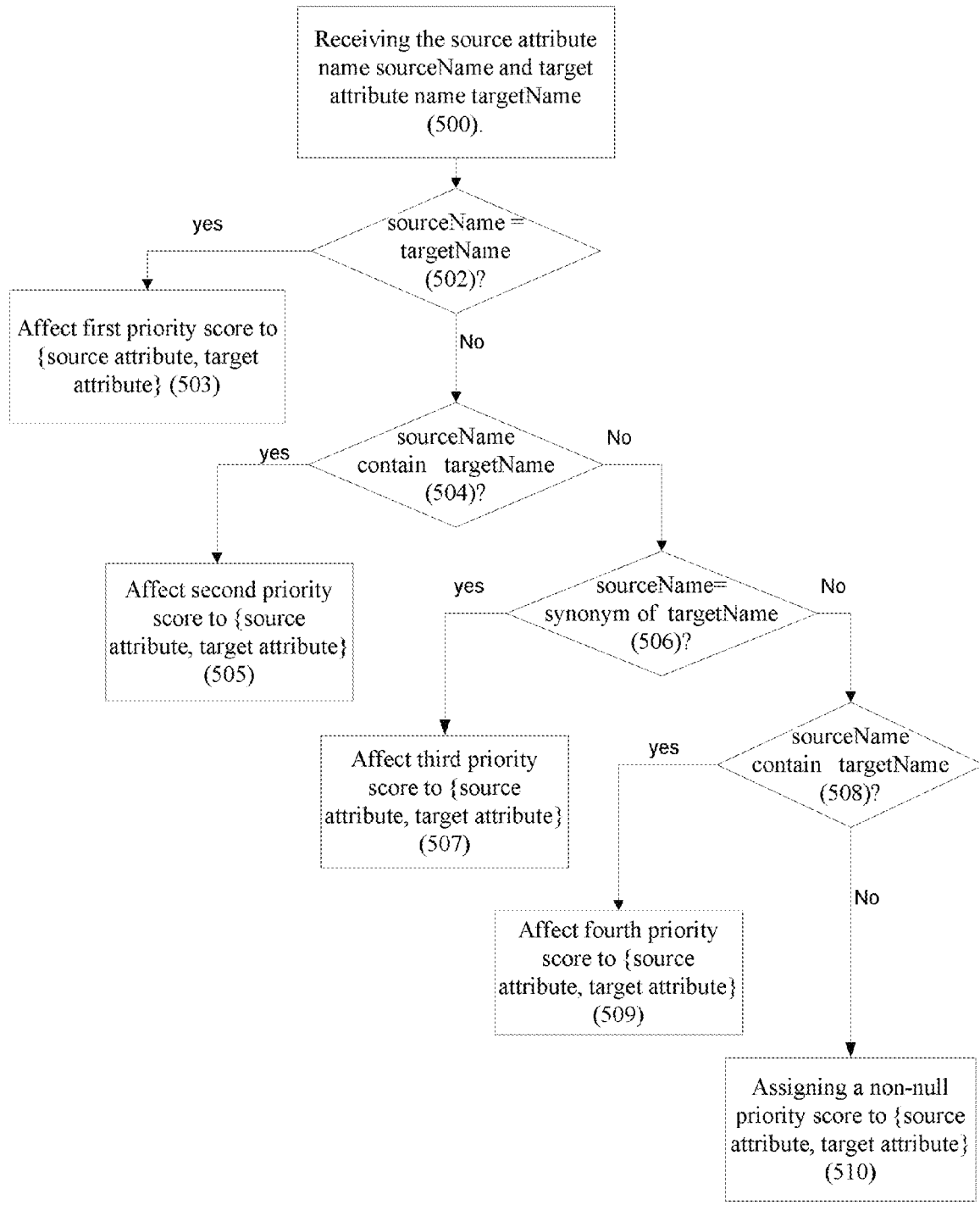
FIG. 5 shows a flowchart of exemplary name matching rules.

FIG. 5 is a flowchart illustrating exemplary matching rules that could be applied to a pair consisting of a source attribute and a target attribute (500).

Step 502 determines if the source attribute name sourceName equals the target attribute name targetName, and if so affects the highest priority score (first priority score) in step 503.

If the test of step 502 fails, step 504 applies a second matching rule related to the source and target attributes names, and if this rule is satisfied affects a second priority score that is lower than the first priority score in step 505. In FIG. 5, the second matching rule that is represented consists in determining if the source attribute name sourceName contains the target attribute name targetName.

If the second naming matching rule is not satisfied, step 506 applies a third matching rule related to the source and target attributes names, and if this third rule is satisfied a third priority score that is lower than the second priority score is affected to this pair of attributes, in step 507. In FIG. 5, the third matching rule that is represented consists in determining if the source attribute name sourceName is a synonym of the target attribute name targetName.

If the third naming matching rule is not satisfied, step 508 applies a fourth matching rule related to the source and target attributes names, and if this fourth rule is satisfied a fourth priority score that is lower than the third priority score is affected to the pair correspondence in step 509. In FIG. 5, the fourth matching rule that is represented consists in determining if the source attribute name sourceName contains a synonym of the target attribute name targetName.

Finally, if no name matching rule has been satisfied, in step 510, a non-null priority score is assigned to the pair.

Thereby the invention ensures that each correspondence between a source attribute and a target attribute is assigned a non null priority score, even if the match is not exact or no matching rule has been satisfied.

Figure 6:
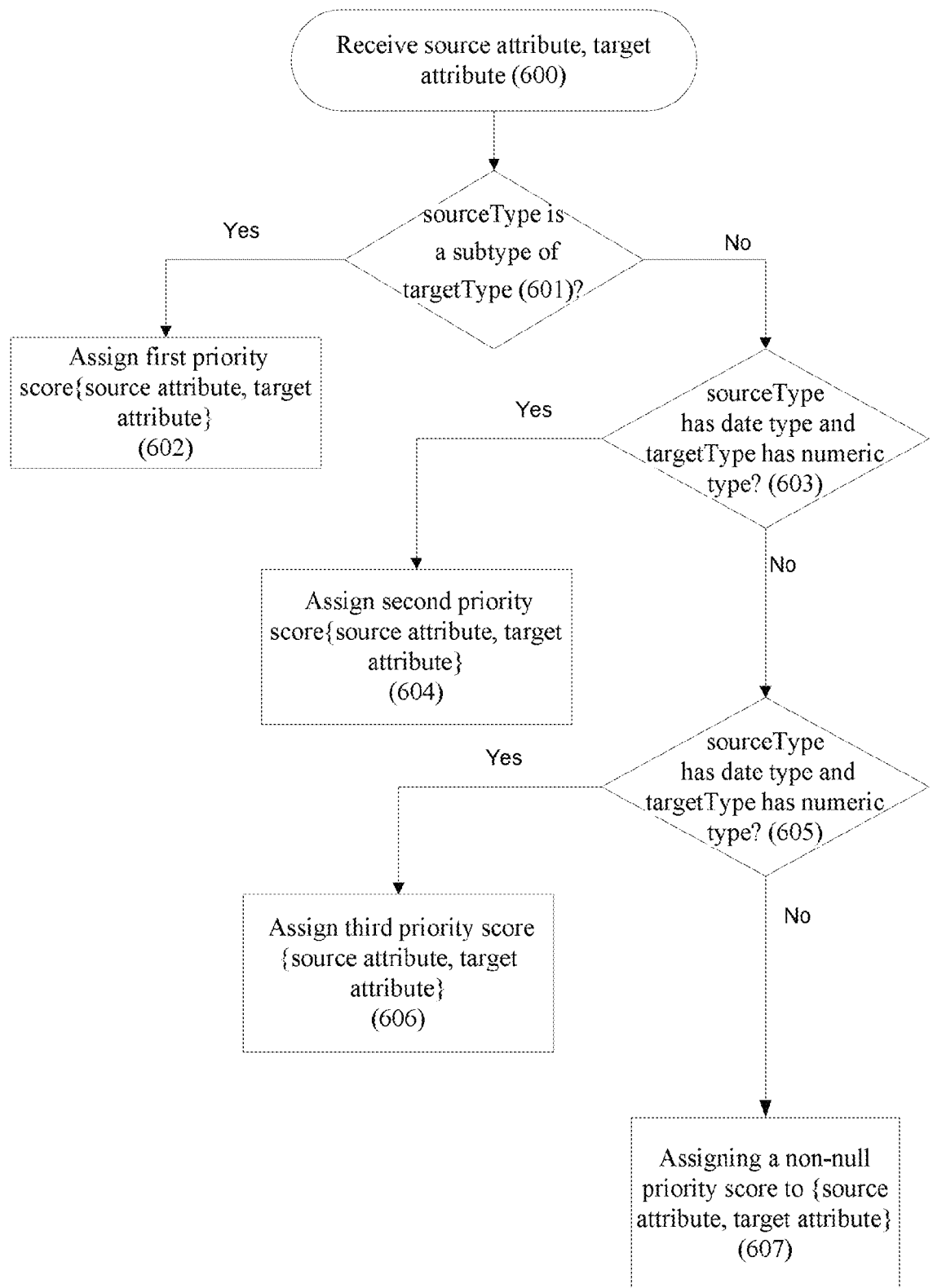
FIG. 6 shows a flowchart of exemplary type matching rules.

FIG. 6 is a flowchart illustrating another example of matching rules that could be applied to score a correspondence between a source attribute and a target attribute.

In the example of FIG. 6, matching rules related to the types of the source attribute and the target attribute are applied in a predefined order. When an attribute type is determined to be atomic (i.e. the type can be considered as consisting of a single value, such as a string, an integer, a float, a date . . . ), the attribute type is allowed to be converted into another type even if the conversion is approximate. For instance, numeric types can be converted to string types by taking their decimal representation. String types can be converted to numeric types by interpreting their characters as sequences of bytes and converting the first 8 bytes into their number equivalent. Dates can be converted to numeric types by taking their value in seconds since a given origin. This ensure that there is always a matching result found (i.e. the matching score will never be 0).

More specifically, step 600 receives the source attribute and the target attribute being considered to determine their matching score.

In step 601, it is determined if the source attribute type sourceType is a subtype of the target attribute type targetType. If so, the highest priority score (first priority score) is assigned to the pair {source attribute, target attribute} in step 602.

If step 601 is not satisfied, step 603 determines if the source attribute type sourceType is of date type and if the target attribute type targetType is numeric. If so, a second priority score with a lower value than the first priority score is assigned to the pair {source attribute, target attribute} in step 604.

If step 603 is not satisfied, step 605 determines if the source attribute type sourceType is a numeric and if the target attribute type targetType is of date type. If so, a third priority score with a lower value than the first priority score is assigned to this pair {source attribute, target attribute} in step 606.

If step 603 is not satisfied, the lowest priority score is affected to the pair {source attribute, target attribute}.

Finally, if no type matching rule has been satisfied, step 607 assigns a non-null priority score to the correspondence {source attribute, target attribute}.

According to other embodiments of the invention, additional matching rules may be used to match a source attribute with attributes in the target data model 110. In particular, the model matching method may apply other matching rules related to the information stores in the auxiliary data repository 115. For instance, if a target attribute "duration" is associated with the target model, an auxiliary attributes expression that may be used by the model matching unit 111 could be: end( )-start( ).

Similarly, a default label attribute can be defined as a concatenation of all the attributes of the source model.

To refine the solutions, content-checking rules can be additionally used by the model matching unit to check conditions on the actual values associated with the source attribute and assign source attributes to specific target attributes if the content-checking rules are satisfied.

Even if the above description has been made with reference to a source data structure describing objects made of flat collections of named and typed attributes, the invention also applies to other source data model structures that are not provided as a flat list of objects, using a suitable pre-processing phase to convert the source data structure into a flat list of data types (e.g. if the source data model is a collection of homogeneous objects organized as a hierarchy). Similarly, in situations where the source data model 110 is structured as a flat list of homogenous objects while the target data model expects a hierarchy or a list of lists or a graph of nodes, a pre-processing phase may be applied to recreate the target data organization.

Figure 7:
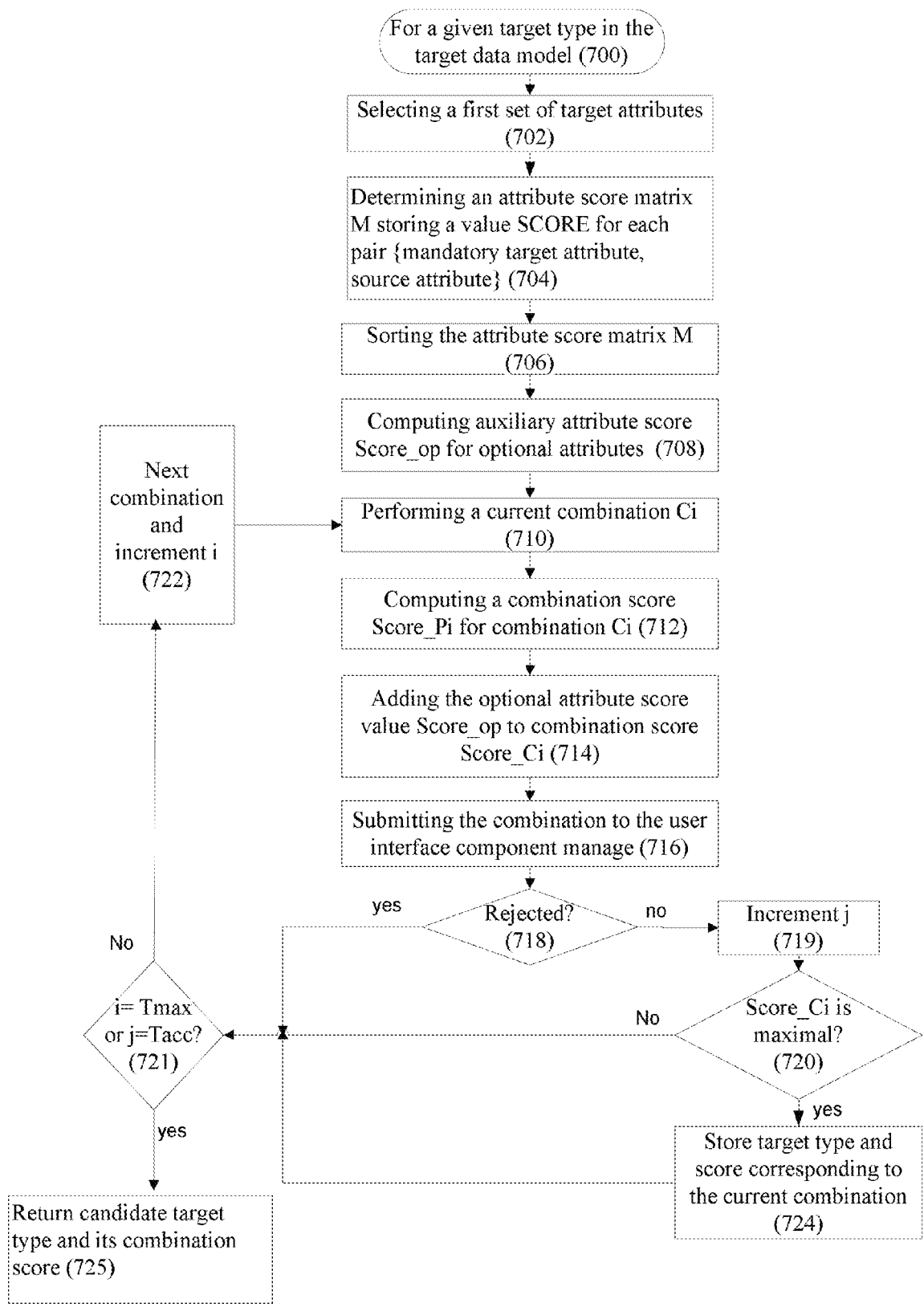
FIG. 7 shows a flowchart for the determination of the target type score.

FIG. 7 is a flowchart for the determination of the target type score of a current target type (step 402 of FIG. 4), according to certain embodiments of the invention.

The processing starts in step 700 with a current Target Type of the target model TM that is to be processed with respect to the source type for which the best match is to be determined.

In step 704, a first set of attributes of the target type is processed. The first set of attributes of the target type represents in particular the attributes required by the user interface component to allow generation of the display. They may be identified from information stored in the target model or the attribute information store 109. The attributes of the first set will be referred thereinafter as "mandatory" target attributes.

In step 704 an attribute score data structure such as a matrix M is generated. The attribute score matrix M stores a score value for each correspondence between a source attribute in the source type/object and each mandatory attribute in the target type T. The score value for each pair is computed by applying the set of matching rules 114. In accordance with the invention, the set of matching rules are applied so as to ensure that each pair {source attribute, target attribute} will have a non-null score value.

For example, if there are m target mandatory attributes and n available source attributes, the matrix M could be generated as a list of m rows (one for each mandatory target attribute), each row having n columns (one for each source target attribute). Each cell in the matrix will then identify a target attribute, a source attribute, and provide a score value for the pair of attributes identified in the cell.

As a result of step 704, the attribute score matrix M comprises score values for the different pairs of target attribute (of target type) and source attribute (of source type).

The matrix M thus obtained is then used to test combinations representing candidate target types. Each combination will associate each target mandatory attribute with a unique source attribute of the source data type (or object). Accordingly, each current combination will comprise pairs consisting of a target mandatory attribute and source attribute (as many pairs as target mandatory attributes).

For each tested combination Ci, the corresponding combination score is then computed as the sum of the scores associated with each pair using the attribute score matrix M. An auxiliary score value corresponding to a second set of attributes in the target model ("optional" attributes) may be added to the current combination score. The target type corresponding to the combination that provides the best combination score will be returned as a target type candidate for the considered source type (for step 405 processing).

Steps 706 to 725 illustrate a particular embodiment of this phase of testing combinations based on the attribute score matrix M obtained in step 704.

In step 706, the attribute score matrix M is topologically sorted by decreasing value of scores, starting first by row, and then by column. This step of sorting the matrix by score aims at limiting the computational costs of the combination testing phase.

More specifically, each row in the matrix can be sorted by decreasing score, so that the first entries in the row for a given mandatory source attribute corresponds to the source attributes that match them best.

The columns can then be sorted by decreasing score, (e.g. the decreasing order of the first column score, or the average of the columns score). As a result, after sorting the matrix M, the first rows of the matrix will correspond to the rows for which a best match has been found.

In step 708, the auxiliary attribute score Score_op is computed for a second set of attributes in the target type. The second set of attributes ("optional" attributes) represents attributes that are not required by said user interface component manager 107. They may be identified in the target data model 112. Alternatively, the model adaptation subsystem 101 may maintain or pre-determine the second set of attributes. In step 708, each optional attribute in the target type is matched to a source attribute of the source type or object, only if the matching score between the optional attribute and the source attribute is above a predefined threshold. The auxiliary attribute score Score_op is computed from the matching scores satisfying this condition (step 708 will be described in more detail below with relation to FIG. 9).

In step 710, iterations are started over all the possible combinations of pairs Ci consisting of a target mandatory attribute and a source attribute (of the source type/object). Each combination associates each mandatory target attribute with a unique source attribute of the considered source type. A counter i is initialized as a counter of the combinations. In particular, each combination may be determined by a row permutation of the attribute score matrix M (as sorted in step 706) by decreasing score order. According to the embodiments represented in FIG. 7, the row permutations (combinations) are iterated up to a maximum threshold Tmax defining a maximum number of combination tries. The maximum threshold is such that it is never reached in practice.

For instance, given the target attributes {begin, end} and the source attributes {start, stop, length}, possible row permutations will comprise the set:

> C1- {begin->start, end->stop},
> C2- {begin->start, end->length},
> C3- {begin->stop, end->start},
> C4- {begin->stop, end->length},
> C5- {begin->length, end->start}, and
> C6- {begin->length, end->stop}}.

The limitation of the number of permutation iterations may be particularly advantageous for target data models involving an important number of mandatory attributes, so that many combinations could be generated.

By previously sorting the rows and columns of the matrix by decreasing scores, the best possible matches are likely to be found first, thereby optimizing the processing.

In step 712, for the current combination Ci, a matching score is then computed Score_Ci by summing the score values corresponding to the combination pairs, using the information maintained in the attribute score matrix M. The combination matching score Score_Ci is then added the auxiliary attribute score Score_Op determined for the optional attributes in step 714.

In step 716, the current combination is submitted to the user interface component manager 107. The user interface component manager 107 can accept or reject the proposed combination based on various grounds. For instance, a Gantt component may reject a combination { begin->stop, end->start} after checking the actual data stored in the source data model and determining that it would result in activities that end before they have begun, which is inadequate for Gantt displays.

If the combination is accepted, an acceptable combination counter j is incremented in step 718 to count the number of acceptable combinations.

In step 720, it is determined if the current combination provides a better combination score Score_Ci than the combination scores computed for previously tested combinations.

If the combination has the optimal combination score Score_Ci, the current combination score is stored for later comparison with the next combinations in step 724 (for next iterations of step 720).

Step 721 is then performed to process the next combination. Step 721 is also performed if the combination is rejected by the user interface component in step 718 or if the combination score Score_Ci is not determined to be higher than the previously computed scores in step 720.

Before processing the next combination, step 721 previously checks if the number of "acceptable" combinations already computed j has reached a predefined threshold Tacc or if the number of combinations i has reached the maximum number of allowed permutations (Tmax). If one of these thresholds has been reached, step 725 returns the combination among the tested combinations that provides the best combination score (the combination having the higher combination score among the tested combinations) as a matching target type candidate (for use in step 405 of FIG. 4).

If none of the conditions of step 721 is satisfied, the next combination is processed by repeating steps 704 to 724.

Accordingly, the invention can determine a target type candidate for a given source type/object in two passes:

In a first pass, a match is determined for the "mandatory" target attributes in the targetType and the matching pairs are scored (even if the match is not exact); the number of solutions explored may be capped to a reasonably high threshold that is not reached in practice;

In a second pass, the optional attributes are handled, but they are only taken into account if a satisfying level of matching is found.

Figure 8:
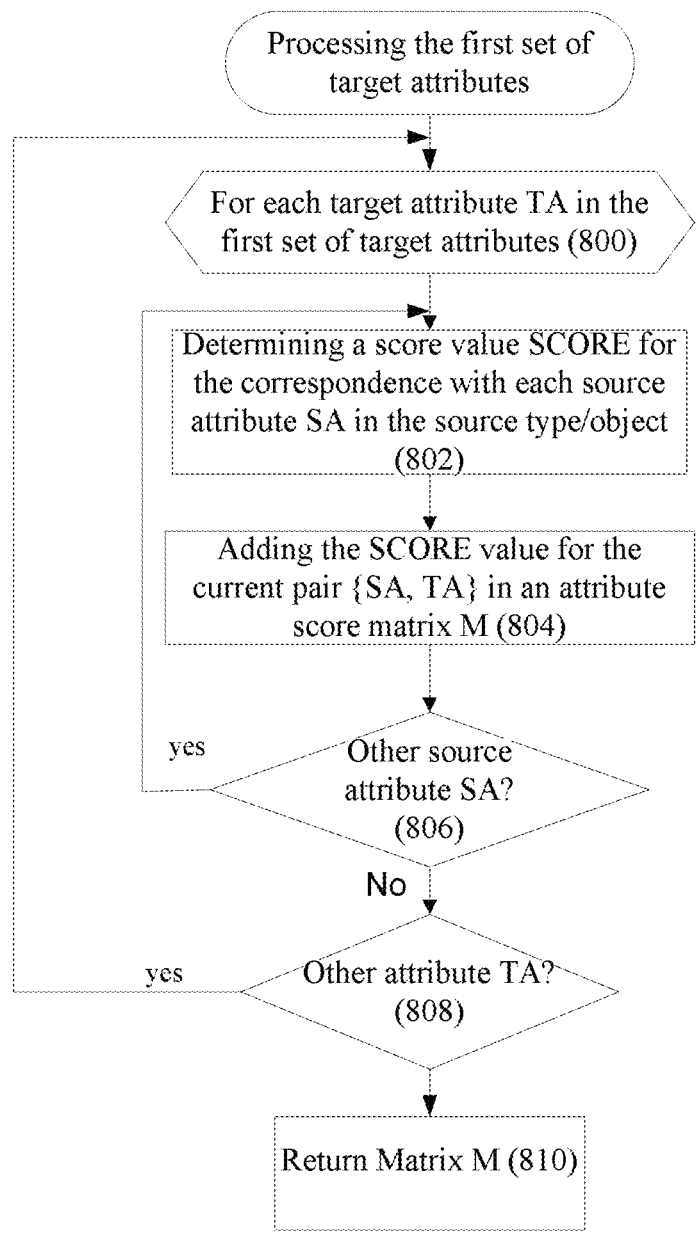
FIG. 8 shows a flowchart for the determination of the attribute score matrix.

FIG. 8 is a flowchart for the determination of the attribute score matrix (step 704 of FIG. 7) for the first set of attributes (mandatory attributes)

The processing starts for each attribute TA in the first attribute set of the target type in step 800.

For the current target attribute TA of the first attribute set, each attribute SA in the source type SourceType or source object sourceObject is selected. Step 802 computes a score value for the pair {SA, TA} as a combination of matching scores comprising a first matching score nameMatch(SA, TA) obtained as a result of a set of name matching rules on the pair {SA, TA} and a second matching score typeMatch(SA, TA) obtained as a result of a set of type matching rules on the pair {SA, TA}. In particular, the score value is computed as:

$$Score=nameMatch(SA, TA)+typeMatch(SA,TA).$$

Step 804 adds the score thus obtained in the attribute score matrix in association with said target attribute and said source attribute.

Step 802 to 804 are repeated for the other source attributes in the source type until all source attributes have been processed (step 806).

When all the source attributes have been processed, the next target attribute in the first target attribute set is processed in step 808.

The processing ends when all the target attributes in the first target attribute set have been processed. The attribute score matrix is then returned in step 810.

Accordingly, the model matching unit 111 is adapted to return a positive score result in response to the application of a set of matching rules, in most cases. As a result, it can find for any source data type a matching data type in the target model, while ensuring a correct representation by the user interface component 108, in a transparent and fault-tolerant manner.

Figure 9:
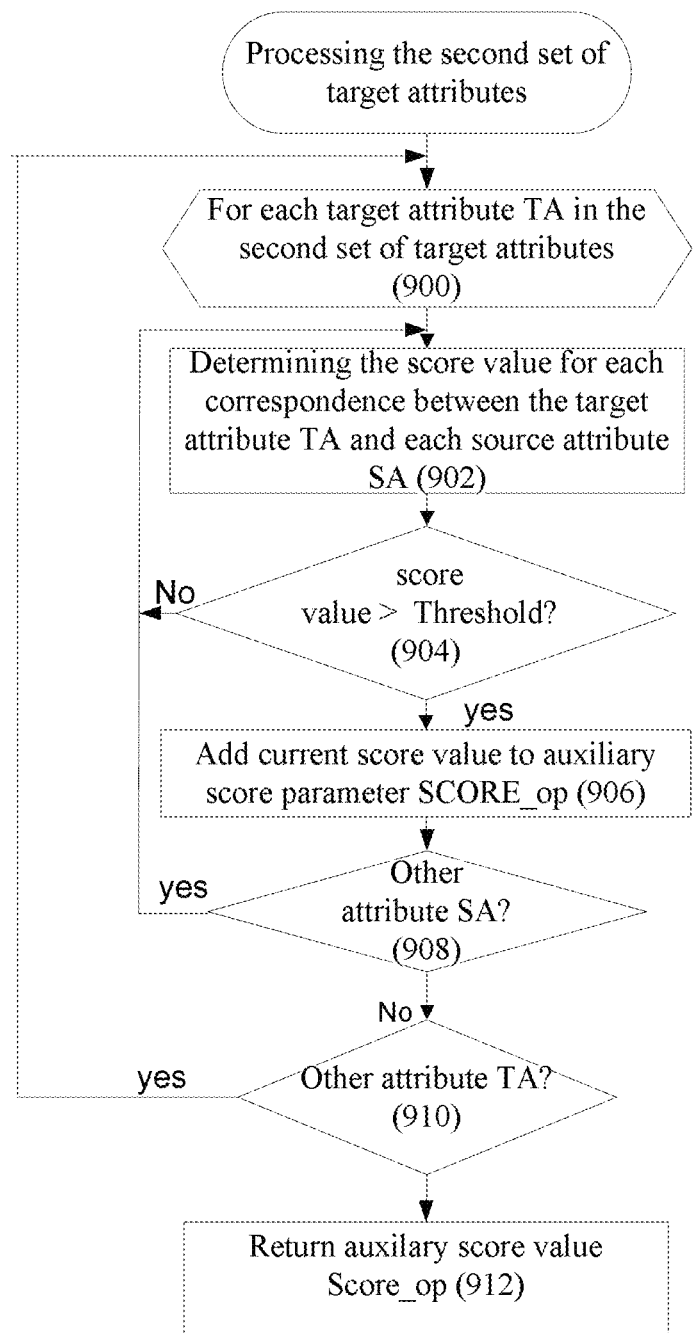
FIG. 9 shows a flowchart for the determination of the auxiliary attribute score.

FIG. 9 is a flowchart for the determination of the auxiliary attribute score Score_op (step 716 of FIG. 7) for the second set of attributes (optional attributes).

The processing starts for each attribute TA in the second attribute set of the target type in step 900.

Similarly to the method illustrated in FIG. 8, for each current target attribute TA of the second attribute set, each attribute SA in the source type SourceType or source object sourceObject is selected and step 902 computes a score value for the pair {SA, TA} as a combination of matching scores comprising a first matching score nameMatch(SA, TA) obtained as a result of a set of name matching rules on the pair {SA, TA} and a second matching score typeMatch(SA,TA) obtained as a result of a set of type matching rules on the pair {SA, TA}. In particular, the score value for the pair SA and TA is determined as:

$$Score=nameMatch(SA, TA)+typeMatch(SA,TA).$$

In step 904, it is determined if the score value thus obtained for pair {SA, TA} is higher than a predefined threshold. If so, step 906 adds the current optional attribute score to an auxiliary attribute score Score_op (initially set to zero). In step 908 or if the condition of step 904 is not satisfied, the next source attribute is processed (step 909) by iterating steps 902 to 908, until all source attributes are processed. When all source attributes have been processed, the next target attribute of the second attribute set (910) is processed until all target attributes are processed. When all the optional target attributes have been processed, the auxiliary attribute score Score_op is returned in step 912.

The model matching solution in accordance with the embodiments of the invention can be used in a variety of contexts to allow generating a representation of a complex source data model in a user interface component.

Even if not limited to such applications, the invention has particular advantages for the following user interface components:

Gantt chart/timelines,
  most types of charts such as 1-dimensional charts, including various types of histograms, 2D plots, parallel coordinates or parallel histogram visualization tools; for such charts, the target data models are represented by sequences of points, and other attributes such as labels, partitioning methods, colors and sizes, Tree map tools: the target model for such user interface components generally involves a hierarchy, a size attribute, a color attribute and an ordering attribute, Network visualization tools, provided with a target model involving nodes and links lying out on the plane by various types of graph drawing algorithms.

FIG. 10 represents an exemplary portion of a source data model in OPL language that is to be represented in a user interface component of the type Gantt chart. The source data model is generated by an optimization application.

As shown in FIG. 10, the source data model portion has a Gantt chart compatible structure.

The "anIntervalArray" element is defined as an array of two values <10, 20, 10, "Interval 1", A, 10> and <15, 18, 5,"Interval 2", 1, 20>, each being an instance of the "MyInterval" structure. The solution provided according to the embodiments of the invention is represented in FIG. 11. This will allow displaying the "anInterval" element on the target graphical tool (user interface component)

Figure 12:
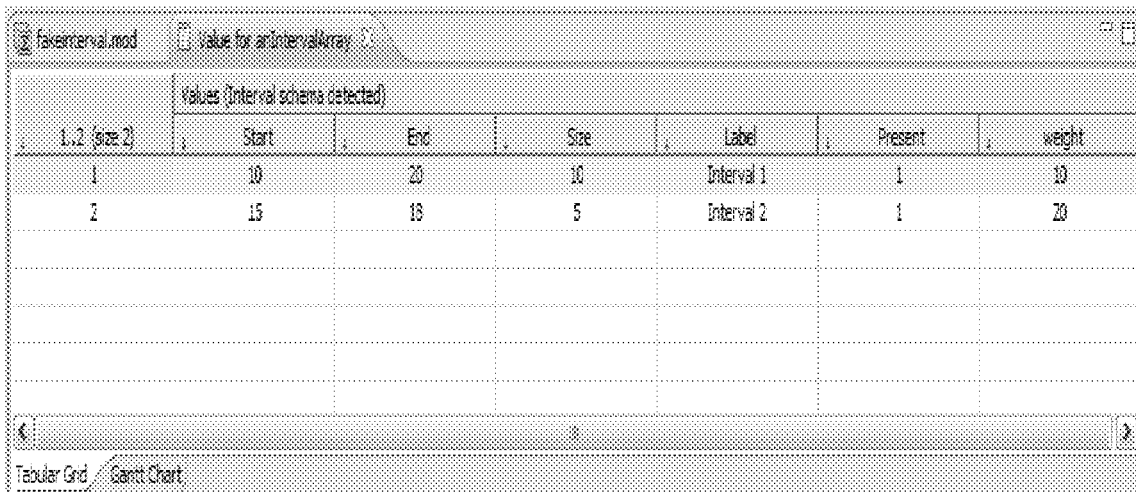
Figure 13:
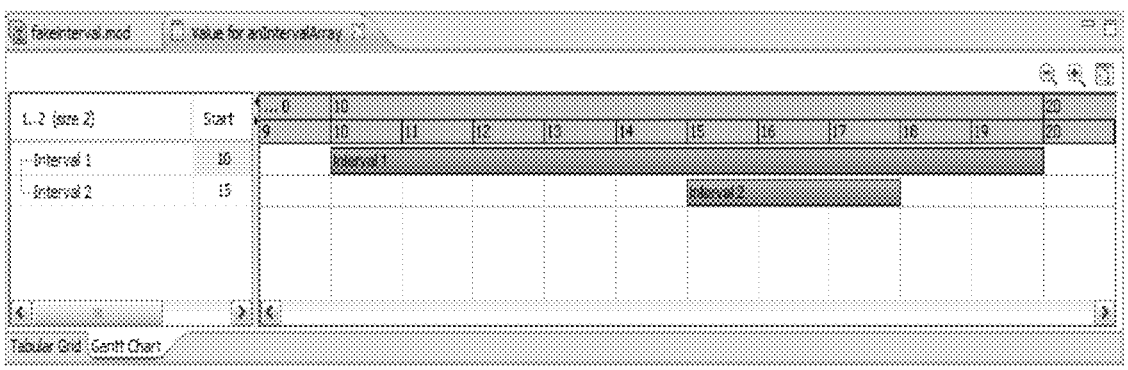

Selecting the "Show data view . . . " link opens a data view for the "anIntervalArray" element, with two parts:

1. A standard array grid view, common to all array elements as represented in FIG. 12. The information that the array structure is compatible with a Gantt chart may be also displayed.
2. A Gantt chart is also displayed because the system recognizes "anIntervalArray" to be compatible, as illustrated in FIG. 13.

In integrated development environment (IDE), such as the Eclipse development environment, the invention can allow the IDE users to benefit from advanced visualization component to explore their data structures during the design and prototyping stages of the development. The developers are not required to complete their design or create a specific model adapter before they can view and manipulate their application data.

The invention accordingly allows a user interface component to take as input any data model that is discoverable (i.e the objects that constitute the model can be inspected through introspection and their attributes and values can be queried) and introspect the source model to allow displaying and interacting with only the subset of the items that match the compatible target model of the interface.

The invention solution relies on a "partial" matching solution that makes it possible to transparently generate a display of the source data model even if no full matching is found between the source data model and the target data model, without requiring a correction phase or user inputs. With the invention, it is not required to provide a complete match from a data model to another, or return a match that is very close to a perfect match between data structures.

Further, user intervention is not required to resolve missing matches and no error message is returned when there is a large discrepancy between the target model and the source model. Instead, it provides a match in most cases with satisfying display on the user interface component. According to the embodiments of the invention, even if some objects cannot be matched to the target model, the source model will still be represented.

With the invention, the user interface component can provides sophisticated user interaction and visualization and is connectable to any data model that partially match the component's requirements.

The invention can take the form of an entirely hardware embodiment, an entirely software embodiment or an embodiment containing both hardware and software elements. In particular it will be appreciated that while some figures are presented in the form of hardware, exactly equivalent effects could be achieved in software. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

```
E1
Tuple {
  Start: int;
  End: int;
  Duration: int;
  Label: string;
```

-continued

```
}
Tuple data[ ]={{1, 2, 1, "event1"},{2, 4, 2, "event2"}};
E2
interface GanttModel {
    Collection<Task> tasks( );
};
interface Task {
    float begin( );
    float end( );
    float duration( );
    // optional
    String name( );
};
E3
Source Model SM=source data model;
Target Model TM= target component abstract model;
Collection C;
For each object A in SM
    DataType T = ClosestType(A,TM)
    If (T is not null)
        Object P = instance of T binding A attributes
        Add P to collection C;
Instantiate target component with C;
Source Model SM=source data model;
Target Model TM= target component abstract model;
Map proxies;
For each type T in SM
    DataType TT = ClosestType(T,TM)
    If (T is not null)
        ProxyClass P = Subclass of TT binding class T
        proxies.put(T,TT);
    End for
Collection C;
For each object A in SM
    Class tc=proxies.find(A.type);
    Object P=new instance of tc(A);
    Add P to collection C;
Instantiate target component with C;
E4
Source Model SM=source data model;
Target Model TM=target component abstract model;
Map proxies;
For each type T in SM
    DataType TT = ClosestType(T,TM)
    If (T is not null)
        ProxyClass P = Subclass of TT binding class T
        proxies.put(T,TT);
    End for
Collection C;
For each object A in SM
    Class tc=proxies.find(A.type);
    Object P=new instance of tc(A);
    Add P to collection C;
Instantiate target component with C;
E5
Class ProxyGanttModel implements GanttModel {
    List tasks=new List( );
    {
        tasks.add(new ProxyTask(1, 2, 1, "event1"));
tasks.add(new ProxyTask(2, 4, 2, "event2"));
    }
    Collection<ProxyTask>tasks( ) { return tasks};
}
Class ProxyTask implements Task {
    Tuple originalTuple;
    float begin( ) { return originalTuple.Start; }
    float end( ) {return originalTuple.End; }
    float duration( ) { return originalTuple.Duration; }
    // optional
    String name( ) { return originalTuple.Label; }
}
```

The invention claimed is:

1. A method, wherein the method comprises:
for a source data type of a source data model and a target data type of a target data model,
   selecting, using a processor of a computer, a first set of target attributes that represent attributes used by a user interface component for generation of a display and a second set of target attributes that are auxiliary attributes;
   determining a score value for each attribute pair formed by a target attribute in the first set of target attributes and a source attribute in source attributes of the source data type based on a set of matching rules;
   determining an auxiliary attribute score associated with the second set of target attributes;
   for each of the target attributes in the first set of target attributes,
      determining a combination score by summing each score value for that target attribute and each of the source attributes; and
      adding the auxiliary score to the combination score; and
   identifying a matching target data type for the source data type based on a highest combination score.

2. The method of claim 1, further comprising:
determining a matching score value for each attribute pair formed by an auxiliary attribute in the second set of target attributes and a source attribute from the source attributes based on a set of matching rules, wherein an auxiliary attribute in the second set of target attributes is used to determine the auxiliary score in response to the matching score for that auxiliary attribute and a source attribute exceeding a predefined threshold.

3. The method of claim 1, further comprising:
storing the score values in a matrix.

4. The method of claim 3, further comprising:
topologically sorting the matrix by score value.

5. The method of claim 3, wherein each combination of that target attribute and each of the source attributes corresponds to a row permutation of the matrix by score order.

6. The method of claim 1, further comprising:
submitting a target data type associated with each combination score to the user interface component; and
deselecting a corresponding target data type that is rejected by the user interface component.

7. A computer program product, the computer program product comprising:
a computer readable device having program code embodied therein, wherein the program code, when executed by a processor of a computer, is configured to perform:
for a source data type of a source data model and a target data type of a target data model,
   selecting a first set of target attributes that represent attributes used by a user interface component for generation of a display and a second set of target attributes that are auxiliary attributes;
   determining a score value for each attribute pair formed by a target attribute in the first set of target attributes and a source attribute in source attributes of the source data type based on a set of matching rules;
   determining an auxiliary attribute score associated with the second set of target attributes;
   for each of the target attributes in the first set of target attributes,
      determining a combination score by summing each score value for that target attribute and each of the source attributes; and
      adding the auxiliary score to the combination score; and
   identifying a matching target data type for the source data type based on a highest combination score.

8. The computer program product of claim 7, wherein, when computing a combination score, the program code, when executed by the processor of the computer, is configured to perform:
 determining a matching score value for each attribute pair formed by an auxiliary attribute in the second set of target attributes and a source attribute from the source attributes based on a set of matching rules, wherein an auxiliary attribute in the second set of target attributes is used to determine the auxiliary score in response to the matching score for that auxiliary attribute and a source attribute exceeding a predefined threshold.

9. The computer program product of claim 7, wherein, when computing a combination score, the program code, when executed by the processor of the computer, is configured to perform:
 storing the score values in a matrix.

10. The computer program product of claim 9, wherein, when computing a combination score, the program code, when executed by the processor of the computer, is configured to perform:
 topologically sorting the matrix by score value.

11. The computer program product of claim 9, wherein each combination of that target attribute and each of the source attributes corresponds to a row permutation of the matrix by score order.

12. The computer program product of claim 7, wherein, when computing a combination score, the program code, when executed by the processor of the computer, is configured to perform:
 submitting a target data type associated with each combination score to the user interface component; and
 deselecting a corresponding target data type that is rejected by the user interface component.

13. A system for adapting a source data model for display in a user interface component, wherein the source data model includes a source data type, wherein the source data type includes source attributes, wherein the user interface component is associated with a target data model that includes a target data type, and the target data type includes target attributes, comprising:
 a processor; and
 memory coupled to the processor, wherein the memory has stored thereon a program, and wherein the processor is configured to execute instructions of the program to perform operations, wherein the operations comprise:
  for a source data type of a source data model and a target data type of a target data model,
   selecting a first set of target attributes that represent attributes used by a user interface component for generation of a display and a second set of target attributes that are auxiliary attributes;
   determining a score value for each attribute pair formed by a target attribute in the first set of target attributes and a source attribute in source attributes of the source data type based on a set of matching rules;
   determining an auxiliary attribute score associated with the second set of target attributes;
   for each of the target attributes in the first set of target attributes,
    determining a combination score by summing each score value for that target attribute and each of the source attributes; and
    adding the auxiliary score to the combination score; and
   identifying a matching target data type for the source data type based on a highest combination score.

14. The system of claim 13, wherein the operations further comprise:
 determining a matching score value for each attribute pair formed by an auxiliary attribute in the second set of target attributes and a source attribute from the source attributes based on a set of matching rules, wherein an auxiliary attribute in the second set of target attributes is used to determine the auxiliary score in response to the matching score for that auxiliary attribute and a source attribute exceeding a predefined threshold.

15. The system of claim 13, wherein the operations further comprise:
 storing the score values in a matrix.

16. The system of claim 15, wherein the operations further comprise:
 topologically sorting the matrix by score value.

17. The system of claim 15, wherein each combination of that target attribute and each of the source attributes corresponds to a row permutation of the matrix by score order.

18. The system of claim 13, wherein the operations further comprise:
 submitting a target data type associated with each combination score to the user interface component; and
 deselecting a corresponding target data type that is rejected by the user interface component.

* * * * *